Aug. 11, 1936.  F. W. ANDERSON  2,050,776
SECTION CAR
Filed Dec. 30, 1935  2 Sheets-Sheet 1
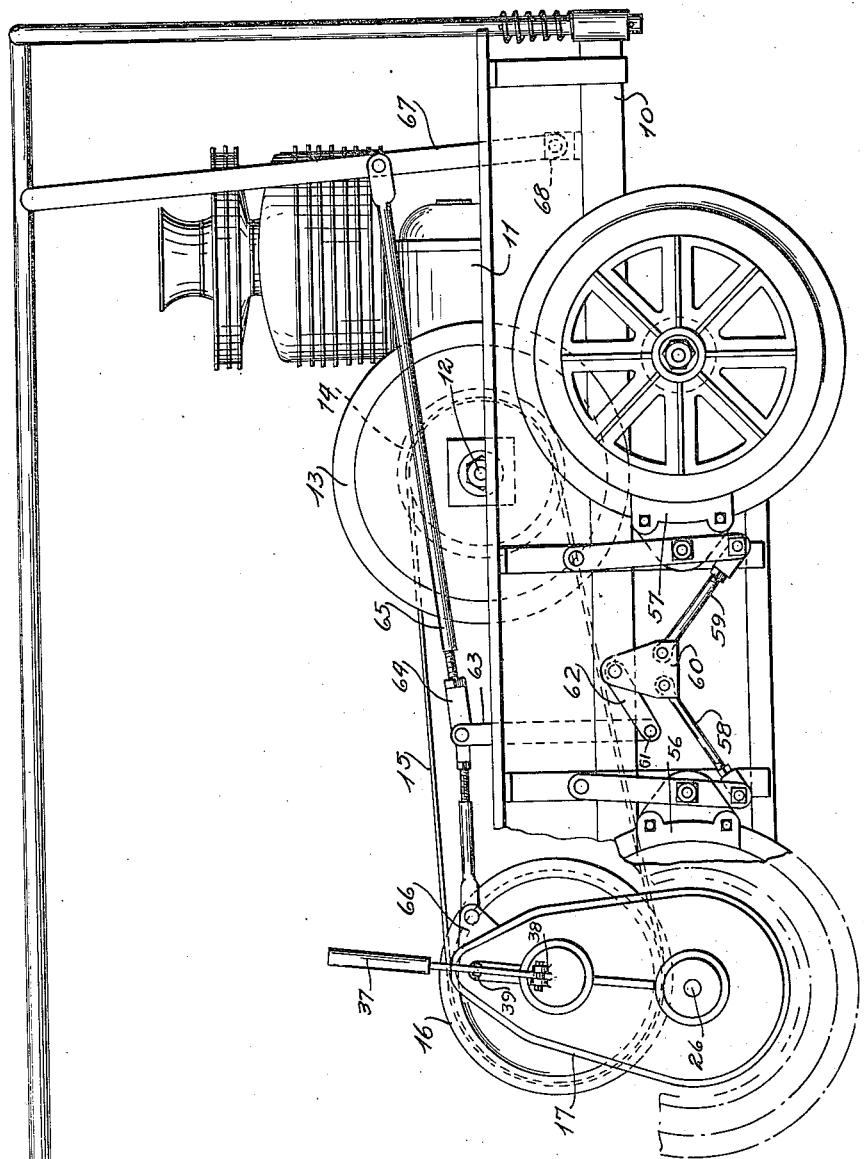

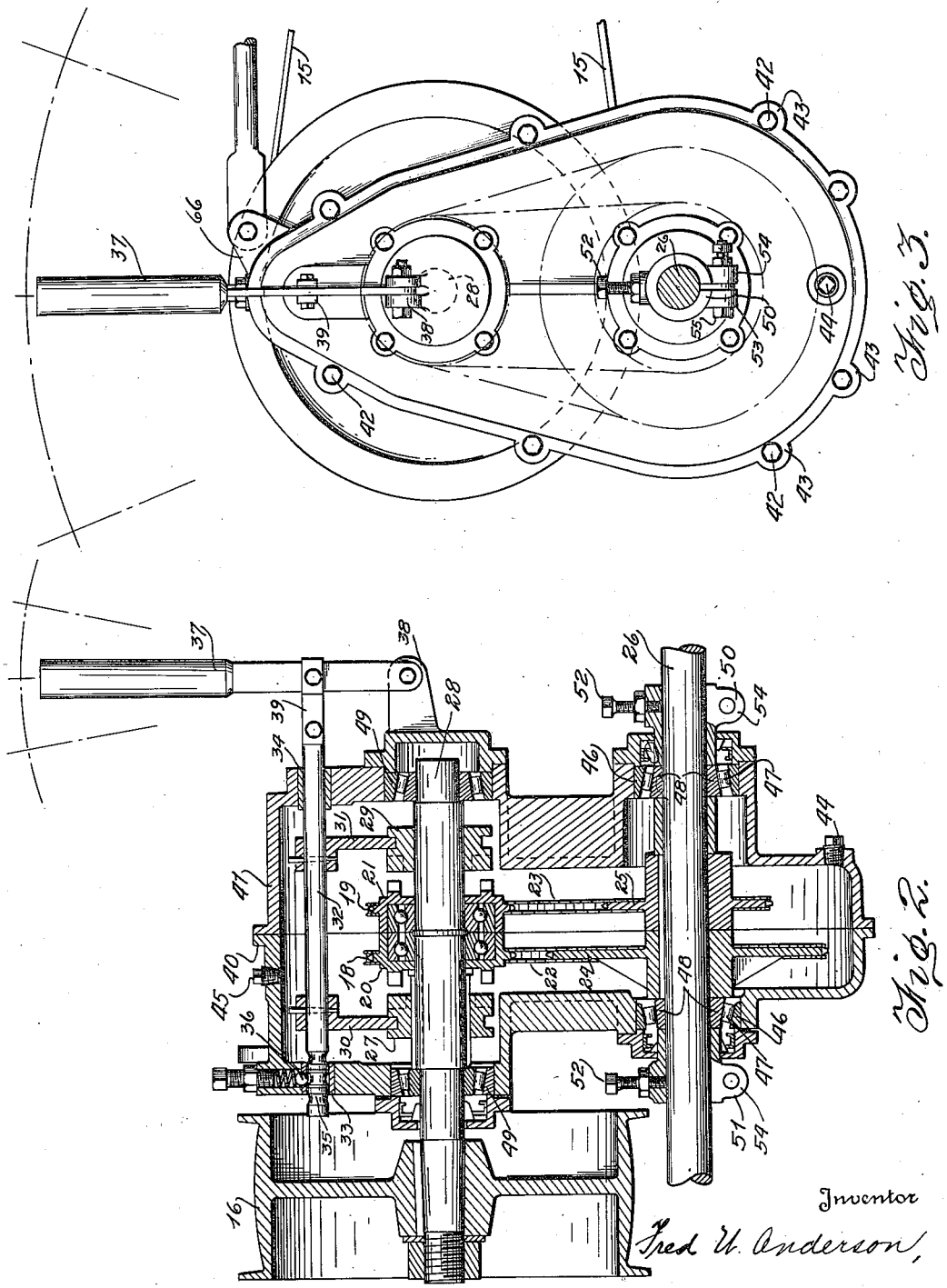

Patented Aug. 11, 1936

2,050,776

UNITED STATES PATENT OFFICE 2,050,776

SECTION CAR

Fred W. Anderson, Eau Claire, Wis.

Application December 30, 1935, Serial No. 56,827

3 Claims. (Cl. 192—11)

This invention relates to driving mechanism and gearing for railway rolling stock, and the invention is of particular importance in connection with so-called "trackmen's" cars, or those employed for conveying materials and workmen to the location of their activities in constructing and repairing railroads.

It is an object of this invention to provide novel means for transmitting and releasing engine power communicated to traction members of a car, the said means eliminating the use of clutches, idle pulleys, loose pulleys, or the provision of a movable engine such as is now commonly employed in power transmissions for cars of the type mentioned. Hence, the object of the invention is the provision of means for controlling the transmission of power from the engine to the traction members of the car by means other than those recited, which other means includes a tilting countershaft to which power is transmitted from the engine to the traction members.

It is furthermore an object of the invention to provide means for tightening a belt between the engine of the car of the character mentioned and the said countershaft, the said belt controlling means including mechanism for tilting or moving the aforesaid countershaft with relation to the engine.

It is a still further object of this invention to provide an engine driven car with instrumentalities whereby the brakes of a car are operated in conjunction with operative means for controlling the tension of a driving belt, by which power is communicated from the engine to the traction members of the car and, more specifically, the invention consists in the provision of novel means for applying or releasing the brakes and simultaneously therewith loosening or tightening the belt, respectively, the said instrumentalities being preferably under the control of a single manually operated element.

It is a further object of this invention to provide a transmission casing oscillatably mounted in connection with a truck of the car and to provide means associated with the casing for transmitting or releasing the drive of the belt to the aforesaid car.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a side elevation of the operative parts of a trackman's car, showing the brake operating mechanism associated with a gear case and other parts by which the car is driven, the side superstructure of the car being omitted;

Figure 2 illustrates a vertical sectional view of the gear case and the transmission gear contained therein; and Figure 3 illustrates a view in elevation of the said gear case and parts associated with it.

In these drawings 10 denotes a frame or car body in which an engine 11 is installed, the said engine being preferably of the gasoline type. The drive shaft 12 of the engine has a fly wheel 13 and a pulley 14, from which a belt or flexible instrumentality 15 is driven, the said member 15 operating over a wheel or pulley 16 secured on a shaft which is rotatably mounted in the gear case 17.

The transmission gearing, in the present embodiment of the invention, consists of two sprocket wheels 18 and 19, each having clutch members 20 and 21, respectively, and the said sprocket wheels are engaged by sprocket chains 22 and 23, respectively, that operate in engagement with sprocket wheels 24 and 25, respectively, on the car axle 26. It is seen that the wheel 24 is of larger diameter than the wheel 25 and a differential drive is therefore afforded for the propulsion of the car. A clutch member 27 is splined on the shaft 28 to which the wheel or pulley 16 is secured, and the said clutch member 27 coacts with the clutch member 20 to communicate the rotary motion of the shaft 28 to the wheel 18. Another clutch member 29 is splined on the shaft 28 and it coacts with the clutch member 21 when in engagement therewith to rotate the wheel 19, and the clutch members 27 and 29 are selectively movable into operative relation with their respective clutch members.

As a means for moving the clutch members 27 and 29, they are associated with engaging arms 30 and 31, respectively, that are pinned or otherwise secured to the rod 32 that reciprocates in bearings 33 and 34 in the gear case. One end of the rod is provided with grooves, such as 35, and one or the other of the said grooves is occupied by a spring-pressed detent 36, which is in the nature of a ball in this embodiment of the invention.

The rod 32 is operated axially by a lever 37 pivoted at its lower end on a bracket or lug 38 on a part of the gear case and through the medium of a link 39 connecting the lever to the said rod.

The gear case, in the present embodiment of the invention, comprises two main sections 40 and 41 secured together by bolts such as 42 extending through coinciding apertures of lugs 43, this being the conventional manner of attaching sections of cases together. A drain plug 44 at the bottom of the casing can be removed for draining the oil therefrom and a filling opening in the top of the case is closed by a plug 45. The assembled sections of the gear case are provided with races 46 which engage anti-friction bearings 47 and these are associated with races 48 on the axle of shaft 26 and through this mounting the case is oscillative with respect to the axle of shaft 26, so that by the said oscillative movement, the pulley 16 is moved toward or away from the engine for controlling the tension of the belt, to which reference has been made.

The shaft 28 has anti-friction bearings 49 at each side of the case and appropriate stuffing boxes such as are usual in constructions of this type are provided. The case is held on the axle or shaft 26 by sleeves 50 and 51 and each of said sleeves has a set screw 52 threaded in it that clamps against the shaft. Each sleeve is split and is provided with apertured ears 53 and 54 that are clamped together by a bolt 55. It is apparent from an inspection of the drawings and the foregoing description that the lever 37 may be manipulated to connect the drive to either of the sprocket wheels, and after this adjustment has been made, power will be transmitted from the engine to the car axle or shaft.

The brake shoes 56 and 57 which are provided on each side of the car are connected on the side of the car which they occupy to links 58 and 59, respectively, and the said links are each pivotally connected to a plate or block 60 which is in an elevated position with respect to the brake shoes. A transversely disposed shaft 61 is appropriately journalled to the car body or frame and an arm 62 attached to the said shaft is pivotally connected to the plate or block 60 in approximately the relation in which it is shown in Fig. 1. An arm 63 is also attached to the shaft 61, or the said arms 62 and 63 may be in the nature of a bell crank lever secured on the shaft 61, so that as the shaft is turned under the influence of the arm 63, it will move the plate or block 60 vertically and thus retract or spread the brake shoes so that they may be forced into engagement with the traction wheels or disengaged therefrom. The arm 63 is connected to a coupling 64, but is adjustably connected to a sectional rod 65. One end of the sectional rod is connected to a lug 66 on the gear case and the other end thereof is connected to an operating lever 67 which, in the present embodiment, has its lower end pivoted to a block or stationary member 68 on the body or frame of the car. It also will be seen that the sectional rod is pivotally connected to the said operating lever 67, so that when the lever 67 is pulled or pushed, it will communicate motion to the brake shoes and to the gear case, and the relation of parts is such that when the brake shoes are forced to braking position, the gear case is moved toward the engine and thus the belt is slack, as compared with its stretched position when the operating lever 67 is moved in the opposite direction to release the brakes, for when the brakes are being released, the plate or block 60 is moved upwardly and the top of the gear case is forced outwardly so that the pulley 16 is moved away from the engine and the belt is tightened.

It is of course understood that the brakes and brake operating parts are duplicated on each side of the car, except as to the duplication of the arm 63. On the side of the car opposite that shown in Fig. 1, the arm 62 is secured on the shaft 61 and connected to the plate or block 60, so that when the shaft is turned under the influence of the arm 63, the brakes will be applied or released.

While the gear case has been described as containing the sprocket wheels and chain driving means, it is obvious that the said case may contain any gear transmitting assembly which could be used to change the speed, or the usual reversing gear could be substituted for the direct driving instrumentalities here illustrated, as such driving instrumentalities are well known in the art.

With reference to the movement of the gear case with respect to the engine, it is obvious that reference is made to the oscillatory or swinging movement of the gear case wherein only the upper portion thereof is moved toward and away from the engine, so that where reference is made to the movement of the gear case toward or away from the engine, this explanation or definition should be taken into account.

I claim:

1. In a trackman's or section car having traction wheels, suitable brakes operating on said wheels, and power propelling means, a flexible member driven by the source of power, a gear case oscillatively mounted on the car wheel axle, transmission gearing in the case including a shaft driven from the source of power, including means for transmitting the power to the traction wheels of the car, a wheel on the aforesaid shaft driven by the flexible member, a brake applying lever, and means for imparting the motion of said lever to the case for oscillating the case toward the driving means when the brakes are forced into engagement with the traction wheels and for swinging the said case away from the driving means when the brakes are released.

2. In a trackman's or section car having traction wheels, brakes mounted and movable for engagement and disengagement with said traction wheels, an engine installed in the car, a gear case oscillative on an axle of the car remote from the engine, a transmission gearing in the gear case coupled to the axle for driving it, means including a pulley and belt connecting the engine and the gearing for communicating the power of the engine to the said axle, a manually actuated member operatively connected to the brakes, and means operated thereby connected to the gear case for oscillating the gear case for slackening the belt when the brakes are being applied and for moving said gear case from the engine to stretch the belt when the mechanism is operated to move the brakes for releasing them.

3. In a trackman's or section car having traction wheels, brakes mounted and movable for engagement and disengagement with said traction wheels, an engine installed in the car, a gear case oscillative on an axle of the car remote from the engine, a transmission gearing in the gear case coupled to the axle for driving it, means including a pulley and belt connecting the engine and the gearing for communicating the power of the engine to the said axle, a manually actuated member operatively connected to the brakes, a member adjustably connected thereto and to the gear case for oscillating the gear case when the manually actuated member is moved, and means for operating said manually actuated member.

FRED W. ANDERSON.